US010196284B2

(12) United States Patent
Wu et al.

(10) Patent No.: US 10,196,284 B2
(45) Date of Patent: Feb. 5, 2019

(54) METHOD AND APPARATUS FOR CONTROLLING WATER OUTPUT OF WATER PURIFIER, WATER PURIFIER, AND STORAGE MEDIUM

(71) Applicant: Xiaomi Inc., Beijing (CN)

(72) Inventors: Ke Wu, Beijing (CN); Xinyu Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 189 days.

(21) Appl. No.: 15/209,940

(22) Filed: Jul. 14, 2016

(65) Prior Publication Data

US 2017/0121184 A1    May 4, 2017

(30) Foreign Application Priority Data

Oct. 28, 2015   (CN) .......................... 2015 1 0714128

(51) Int. Cl.
   *B01D 29/60*   (2006.01)
   *B01D 35/157*  (2006.01)
   (Continued)

(52) U.S. Cl.
   CPC .............. *C02F 1/008* (2013.01); *B01D 29/60* (2013.01); *B01D 35/157* (2013.01); *B01D 36/00* (2013.01);
   (Continued)

(58) Field of Classification Search
   CPC ...... B01D 17/12; B01D 29/60; B01D 29/605; B01D 35/04; B01D 35/157;
   (Continued)

(56) References Cited

U.S. PATENT DOCUMENTS 5,171,429 A * 12/1992 Yasuo ................... E03C 1/0404
                                                        116/202
5,823,229 A * 10/1998 Bertrand .............. B01D 35/043
                                                        137/614.2
(Continued)

FOREIGN PATENT DOCUMENTS

CN      101424476 A      5/2009
CN      104150628 A      11/2014
(Continued)

OTHER PUBLICATIONS

Extended European Search Report of European Patent Application No. 16166834.8, from the European Patent Office, dated Sep. 8, 2016.

(Continued)

*Primary Examiner* — Joseph W Drodge
(74) *Attorney, Agent, or Firm* — Finnegan, Henderson, Farabow, Garrett & Dunner LLP

(57) ABSTRACT

A method for controlling water output of a water purifier is provided. The method includes: determining whether a container is placed in a water collecting region of the water purifier; determining whether there is a content in the container when the container is placed in the water collecting region; acquiring recognition information of the container when there is no content in the container, and determining category information of the container based on the recognition information; determining water output type information corresponding to the container as reference water output type information based on the category information of the container; acquiring content information of the container when there is content in the container, and determining category information of the content based on the content information; and determining water output type information corresponding to the content as reference water (Continued)

output type information based on the category information of the content.

19 Claims, 15 Drawing Sheets

(51) Int. Cl.
| | |
|---|---|
| *B01D 36/00* | (2006.01) |
| *B01D 37/04* | (2006.01) |
| *B01D 61/22* | (2006.01) |
| *C02F 1/00* | (2006.01) |
| *G05D 7/06* | (2006.01) |
| *C02F 9/00* | (2006.01) |
| *H04L 12/46* | (2006.01) |
| *C02F 1/28* | (2006.01) |
| *C02F 1/44* | (2006.01) |
| *C02F 101/20* | (2006.01) |

(52) U.S. Cl.
CPC ............. *B01D 37/04* (2013.01); *B01D 61/22* (2013.01); *C02F 1/001* (2013.01); *C02F 9/00* (2013.01); *G05D 7/0617* (2013.01); *H04L 12/4625* (2013.01); *C02F 1/003* (2013.01); *C02F 1/281* (2013.01); *C02F 1/283* (2013.01); *C02F 1/286* (2013.01); *C02F 1/441* (2013.01); *C02F 1/444* (2013.01); *C02F 2101/20* (2013.01); *C02F 2209/005* (2013.01); *C02F 2209/006* (2013.01); *C02F 2209/008* (2013.01); *C02F 2209/42* (2013.01); *C02F 2303/04* (2013.01); *C02F 2303/22* (2013.01); *C02F 2307/10* (2013.01); *G05B 2219/2605* (2013.01)

(58) Field of Classification Search
CPC .... B01D 35/1573; B01D 36/00; B01D 36/02; B01D 37/04; B01D 37/041; B01D 37/045; B01D 61/10; B01D 61/122; B01D 61/22; B01D 2201/16; B01D 2201/165; B01D 2201/167; B01D 2201/54; B01D 2201/56; B01D 2221/02; B01D 2311/00; B01D 2311/04; B01D 2311/26; B01D 2311/2649; B01D 37/61; B01D 37/10; B01D 37/122; B01D 37/22; B01D 61/12; B01D 2201/52; B01D 2311/02; B67D 3/00; B67D 3/0003; B67D 3/0077; B67D 3/0093; B67D 3/76; B67D 3/766; B67D 2210/00002; B67D 2210/00005; B67D 2210/0001; B67D 2210/00013; B67D 2210/00018; B67D 7/08; B67D 7/22; B67D 7/30; B67D 7/76; B67D 7/766; B67D 7/78; C02F 1/001; C02F 1/003; C02F 1/008; C02F 1/281; C02F 1/283; C02F 1/286; C02F 1/44; C02F 1/441; C02F 1/446; C02F 9/00; C02F 2101/20; C02F 2201/005; C02F 2301/04; C02F 2304/04; C02F 2304/22; C02F 2307/06; C02F 2307/10; C02F 2209/00; C02F 2209/005; C02F 2209/006; F15D 1/14; F16K 31/00; F16K 31/02; H04L 12/4625; G05D 7/06; G05D 7/0617; G05B 2219/2605; G05B 2219/2613; G05B 2219/2642; F15B 13/10
USPC ....... 137/551, 552, 559, 562, 603, 605, 801, 137/861, 883; 210/739, 745, 85, 91, 94, 210/96.1, 96.2, 418, 420, 422, 424, 449, 210/143; 222/25, 28, 52, 61, 64, 222/481–485, 23
See application file for complete search history.

(56) References Cited

U.S. PATENT DOCUMENTS

| | | | | |
|---|---|---|---|---|
| 5,833,849 | A * | 11/1998 | Primdahl | B01D 35/04 210/232 |
| 5,858,215 | A * | 1/1999 | Burchard | B01D 35/04 137/551 |
| 5,961,095 | A * | 10/1999 | Schrott | E03C 1/057 137/801 |
| 6,093,313 | A * | 7/2000 | Bovaird | B01D 35/04 137/551 |
| 9,020,635 | B2 * | 4/2015 | Hortin | F25D 23/126 222/129.1 |
| 2004/0267385 | A1 * | 12/2004 | Lingemann | G05B 15/02 700/83 |
| 2006/0060512 | A1 * | 3/2006 | Astle | B01D 27/101 210/85 |
| 2008/0035241 | A1 * | 2/2008 | Wittbold | A01K 7/06 141/361 |
| 2011/0210068 | A1 * | 9/2011 | Lalor | C02F 9/005 210/636 |
| 2012/0080364 | A1 | 4/2012 | Chen et al. | |
| 2012/0107453 | A1 * | 5/2012 | Chase | F25D 23/126 426/66 |
| 2015/0291409 | A1 * | 10/2015 | Crisp, III | B67D 1/0057 222/23 |
| 2016/0159632 | A1 * | 6/2016 | Wheatley | G06F 19/3475 222/1 |

FOREIGN PATENT DOCUMENTS

| | | | | |
|---|---|---|---|---|
| CN | 104257270 A | | 1/2015 | |
| CN | 105198023 A | | 12/2015 | |
| CN | 105301998 A | | 2/2016 | |
| CN | 105320009 A | | 2/2016 | |
| EP | 1626375 | * | 2/2006 | ............... G07F 9/02 |
| FR | 2365836 A | | 4/1978 | |
| GB | 2280858 | * | 2/1995 | ............... C02F 9/00 |
| KR | 20120060714 A | | 6/2012 | |
| RU | 2472717 C1 | | 1/2013 | |

OTHER PUBLICATIONS

International Search Report of PCT/CN2015/099060, mailed from the State Intellectual Property Office of China dated Aug. 5, 2016.
First Office Action for Chinese Application No. 201510714128.9, mailed from the State Intellectual Property Office of China dated Aug. 5, 2016.
English version of International Search Report of PCT/CN2015/099060, mailed from the State Intellectual Property Office of China dated Aug. 5, 2016.
International Preliminary Report on Patentability issued for International Application No. PCT/CN2015/099060, dated May 1, 2018.

* cited by examiner

METHOD AND APPARATUS FOR CONTROLLING WATER OUTPUT OF WATER PURIFIER, WATER PURIFIER, AND STORAGE MEDIUM

CROSS-REFERENCE TO RELATED APPLICATIONS

This application is based on and claims priority to Chinese patent application No. 201510714128.9 filed Oct. 28, 2015, the entire content of which are incorporated herein by reference.

TECHNICAL FIELD

The present disclosure relates to the field of smart home, and more particularly, to methods and apparatus for controlling water output of a water purifier, a water purifier, and a storage medium.

BACKGROUND

Along with continuous development of science and technology, advanced technologies are continuously applied to daily life of people, and improving quality of life. For example, domestic water usages are not limited to tap water. Instead, tap water can be treated by a water purifier to obtain a different water quality. In related arts, when a user needs to obtain water of a different quality from a water purifier, the user manually selects a water output type. In other words, the water purifier does not automatically output water of a certain water quality corresponding to a water container or to a content in the container. This manual selection wastes time and reduces efficiency of the water purifier usage.

SUMMARY

According to a first aspect of the present disclosure, there is provided a method for controlling water output of a water purifier, comprising: determining whether a container is placed in a water collecting region of the water purifier; determining whether there is a content in the container when the container is placed in the water collecting region; acquiring recognition information of the container when there is no content in the container, and determining category information of the container based on the recognition information; determining water output type information corresponding to the container as reference water output type information based on the category information of the container; acquiring content information of the container when there is content in the container, and determining category information of the content based on the content information; determining water output type information corresponding to the content as reference water output type information based on the category information of the content; determining information of a corresponding water output route according to the reference water output type information; and according to the information of the water output route, controlling the water purifier to output water via the water output route.

According to a second aspect of the present disclosure, there is provided a water purifier, comprising: a processor; a memory for storing a command executable by the processor, wherein, the processor is configured to: determine whether a container is placed in a water collecting region of the water purifier; determine whether there is content in the container when the container is placed in the water collecting region; acquire recognition information of the container when there is no content in the container, and determine category information of the container based on the recognition information; determine water output type information corresponding to the container as reference water output type information based on the category information of the container; acquire content information of the container when there is content in the container, and determine category information of the content based on the content information; determine water output type information corresponding to the content as reference water output type information based on the category information of the content; determine information of a corresponding water output route according to the reference water output type information; and according to the information of the water output route, control the water purifier to output water via the water output route.

According to a third aspect of the present disclosure, there is provided a non-transitory computer-readable storage medium having stored therein instructions that, when executed by a processor of a device, cause the device to perform a method for controlling water output of a water purifier, the method comprising: determining whether a container is placed in a water collecting region of the water purifier; determining whether there is a content in the container when the container is placed in the water collecting region; acquiring recognition information of the container when there is no content in the container, and determining category information of the container based on the recognition information; determining water output type information corresponding to the container as reference water output type information based on the category information of the container; acquiring content information of the container when there is content in the container, and determining category information of the content based on the content information; determining water output type information corresponding to the content as reference water output type information based on the category information of the content; determining information of a corresponding water output route according to the reference water output type information; and according to the information of the water output route, controlling the water purifier to output water via the water output route.

It is to be understood that the above general description and the detailed description hereinafter are only illustrative and interpretative, but not for limiting the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the disclosure are only intended to describe the specific embodiments rather than to limit the disclosure. The terms such as "a/an", "the" and "said" in single forms used in the disclosure and the appended claims are also intended to include plural forms, unless clearly specified otherwise in the context. It should be noted that, the term "and/or" used herein includes any or all combinations of one or more related listed items.

It should be noted that although terms such as "first", "second" and "third" are used to describe various information, such information shall not be limited to these terms. These terms are only used to distinguish information of the same type. For example, when not departing from the scope of the disclosure, first information may also be named as second information, and vice versa. Depending on the context, the word "if" used herein may be interpreted as "when" or "determining that . . . in response to".

Figure 1A:
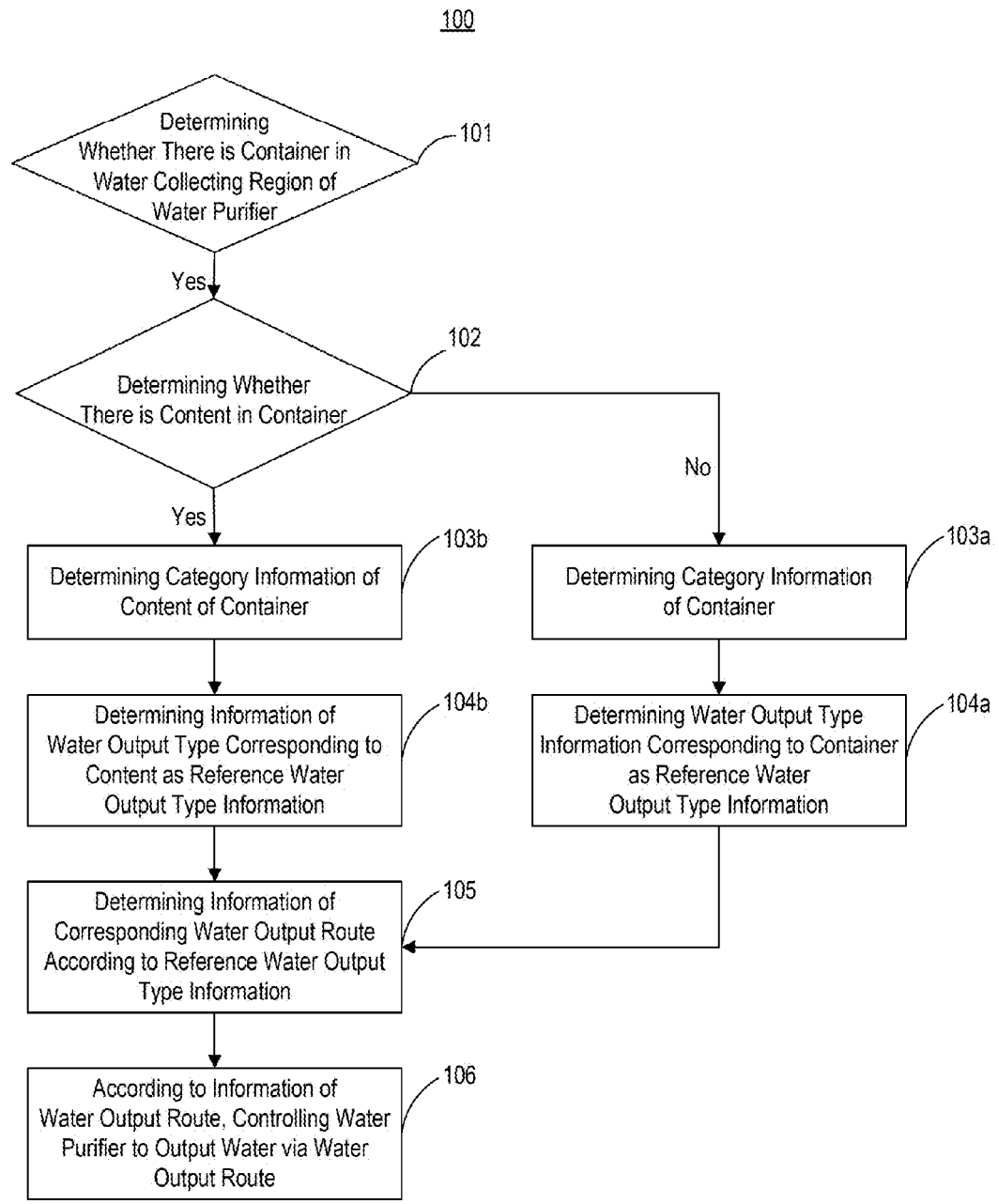
FIG. 1A is a flow chart of a method for controlling water output of a water purifier according to an exemplary embodiment of the disclosure.

FIG. 1A is a flow chart of a method 100 for controlling water output of a water purifier according to an exemplary embodiment of the disclosure. The method 100 can be applied to the water purifier and comprises following steps.

Step 101 includes determining whether a container is placed in a water collecting region of the water purifier. The water purifier is provided with one or more faucets. The container can collect water by being placed in a water collecting region below the faucet of the water purifier. The water collecting region of the water purifier is a region that any container can collect water if placed therein, and the water collecting region of the water purifier may be a spatial region. The disclosure does not limit the water collecting region of the water purifier, and the container can be any container.

In an exemplary embodiment, whether the container is placed in the water collecting region of the water purifier is determined by analyzing an image of the water collecting region of the water purifier. For example, the image of the water collecting region of the water purifier can be captured in real time by an imaging device (such as a camera). The imaging device can be arranged at any position capable of capturing an image of the water collecting region of the water purifier, and the disclosure does not limit the imaging device to a specific position. Next, whether the image of the water collecting region contains an image of the container is determined Specifically, an image of the water collecting region of the water purifier without the container can be acquired and stored in advance as a background image. The image captured in real time is then compared with the background image previously stored, where parts of the captured image different from the background image are analyzed to determine whether the difference is the image of the container and determine whether the captured image contains the image of the container. If the captured image contains the image of the container, it is determined that the container is placed in the water collecting region.

In another exemplary embodiment, whether the container is placed in the water collecting region of the water purifier can be determined by detecting an inductive signal generated by an electronic label of the container. For example, firstly, whether an inductive signal larger than or equal to a preset intensity exists in the water collecting region is determined, where the inductive signal is generated by the electronic label of the container. A product can include electronic labels, which can store various information of the product, such as, production date, product name, product category, and manufacturer. When the container with the electronic label is placed in the water collecting region of the water purifier, a detection device capable of reading the electronic label can be utilized to detect the inductive signal generated by the electronic label of the container, and whether the signal is larger than or equal to the preset intensity. The detection device can be arranged at any position capable of detecting the inductive signal generated by the electronic label of the container, and a specific position of the detection device is not limited in the disclosure. When the detection device detects the inductive signal larger than or equal to the preset intensity in above the water collecting region, it is determined that the container is placed in the water collecting region. The electronic label comprises one or more of: an electronic label containing an NFC chip, an electronic label containing a low power consumption Bluetooth chip, an electronic label containing a low power consumption Wi-Fi chip, an electronic label containing a low power consumption ZigBee chip, or an electronic label containing an RFID chip, etc.

In another exemplary embodiment, whether the container is placed in the water collecting region of the water purifier is determined by utilizing infrared devices. For example, an infrared emitter and an infrared receiver are arranged at certain positions around the water collecting region. When the container is not placed in the water collecting region, the infrared emitted by the infrared emitter can penetrate through the water collecting region, and then absorbed by the infrared receiver. If the container is placed in the water collecting region, the container blocks the infrared, and the infrared receiver does not receive the infrared emitted from the infrared emitter. Hence, whether the container is placed in the water collecting region is determined by the detection of infrared.

Additionally, whether the container is placed in the water collecting region of the water purifier can be determined by other manners, which are not limited in the disclosure.

In an exemplary embodiment, step 102 including determining whether there is a content in the container when the container is placed in the water collecting region. In the present embodiment, whether there is a content in the container or whether the container is empty is determined. When the container is empty, a reference water output type is determined based on a category of the container. When the container is not empty, a reference water output type is determined based on a category of the content in the container.

In an exemplary embodiment, whether content exists in the container can be determined by a plan view image of the container. Firstly, the plan view image of the container can be captured by utilizing a camera device and to ensure that a complete or a relatively complete image of the interior of the container is acquired. The plan view image of the container is then analyzed to determine whether the plan view image of the container contains the image of the content. In general, the interior of the container is relatively flat and smooth. Further, even if there are patterns in the container, the pattern is fixed and does not change or move. Therefore, whether the plan view image of the container contains the image of the content can be determined. If the plan view image of the container contains the image of the content, it is determined that there is content in the container.

In another exemplary embodiment, whether there is content in a container can be determined by an ultrasonic technology. Specifically, ultrasonic waves are emitted above the container to detect whether the bottom of the container is flat. If the bottom of the container is not flat, then it is determined that there is content in the container.

Whether there is content in the container can be determined by any other feasible manners, and the disclosure does not limit specific manners for determining whether there is content in the container.

In an exemplary embodiment, step 103a includes determining category information of the container when there is no content in the container. The container category can be classifying category of the containers. For example, the container category comprises a cup, a bowl, a lunchbox, a vegetable basin, a washbasin, a garbage can, and the like. The container can also comprise other categories, and the disclosure does not limit container categories.

In the present embodiment, the category information of the container is recognized by the recognition information of the container. The recognition information of the container can be information for recognizing a container category. For example, the recognition information of the container is an image of the container or information carried by an electronic label of the container. Additionally, the recognition information of the container can be other information capable of recognizing the container category, and the disclosure does not limit the content or types of the recognition information. The electronic label may be an electronic label containing an NFC chip, an electronic label containing a low power consumption Bluetooth chip, an electronic label containing a low power consumption Wi-Fi chip, an electronic label containing a low power consumption ZigBee chip, or an electronic label containing an RFID chip, etc.

In an exemplary embodiment, step 104a includes determining water output type information corresponding to the container as reference water output type information based on the category information of the container. The water purifier discharges unfiltered tap water and water filtered by different filter cores. For example, the tap water can be filtered by an ultrafiltration membrane to filter sand and the like therein to obtain clean water. The clean water is then filtered by activated carbon, PP cotton and an RO (Reverse Osmosis Membrane) to filter water scale, heavy metal, germs and the like to obtain pure water. The tap water, clean water and pure water can be respectively discharged by controlling valves of the water purifier;

In the present embodiment, the water output type comprises one or more of: output of unpurified water, output of first purified water, and second purified water. The first purified water contains more impurity than the second purified water. For example, the first purified water can be clean water, and the second purified water can be pure water, etc. Additionally or alternatively, the water output type comprises water in other types, such as third purified water and the fourth purified water, and the like, wherein the third purified water is purer than the second purified water and the fourth purified water is purer than the third purified water.

In the present embodiment, different containers correspond to different water output types. For example, the container in the category of cups corresponds to output of pure water. When a cup is used for collecting water, the water purifier discharges pure water. The container in the category of bowls, lunchboxes and vegetable basins correspond to output of clean water. When a bowl, a lunchbox, or a vegetable basin is used for collecting water, the water purifier discharges clean water. The container in a category of wash basins and garbage cans correspond to output of tap water. When a bowl, lunchbox, or vegetable basin is used for collecting water, the water purifier discharges tap water.

In the present embodiment, correspondences of category information of different containers to information of water output types are stored in advance. The correspondences of category information of different containers to information of water output types are set by a user or as a system default, which is not limited by the disclosure.

In an exemplary embodiment, step 103b includes determining the category information of the content in the container when there is content in the container. Contents are placed in the container, and the container is placed in the water collecting region. The contents are, for example, apples, grapes, clothes to be washed, or the like. A category of content can be a category for classifying the content. For example, the content category comprises fruit, vegetable, clothes, grain, and the like. Alternatively or additionally, the content comprises other categories, and the disclosure is not limited to a specific content category.

The content category is recognized by content information of the container. The content information is information capable of recognizing the content category. For example, the content information is an image of the content of the container, or information carried by an electronic label of the content of the container. The content information can be other information capable of recognizing the content category information of the container, and the disclosure is not limited to a specific form of the content information.

In an exemplary embodiment, step 104b includes determining a water output type information corresponding to the content as reference water output type information based on the category information of the content. Different contents of the container correspond to different water output types. For example, the content in the category of fruits corresponds to output of pure water. When a container containing apples is placed in the water collecting region, the water purifier discharges pure water. The content in the category of vegetables corresponds to output of clean water. When a container containing vegetable is placed in the water collecting region, the water purifier discharges clean water. The content in the category of clothes corresponds to output of tap water. When a container containing clothes is placed in the water collecting region, the water purifier discharges tap water.

In the present embodiment, correspondences of category information of different contents to information of water output types are stored in advance. The correspondences of the category information of different contents to the information of water output types are set by a user or as a system default, which is not limited by the disclosure.

In an exemplary embodiment, step 105 includes determining information of a corresponding water output route according to the reference water output type information. A water output route is a water route flown by water discharged by the water purifier. The water output route comprises one or more of a primary water route, a first filtering level water route, and a second filtering level water route, wherein water from the primary water route contains more impurity than water from the first filtering level water route, and water from the first filtering level water route contains more impurity than water from the second filtering level water route. For example, water from the primary water route is unpurified tap water. Further, water from the first filtering level water route is clean water, and water from the second filtering level water route is pure water and the like. Additionally or alternatively, other water routes include, for example, a third filtering level water route, a fourth filtering level water route, and the like, wherein water from the third filtering level water route is purer than water from the second filtering level water route, and water from the fourth filtering level water route is purer than the water from the third filtering level water route.

Figure 1B:
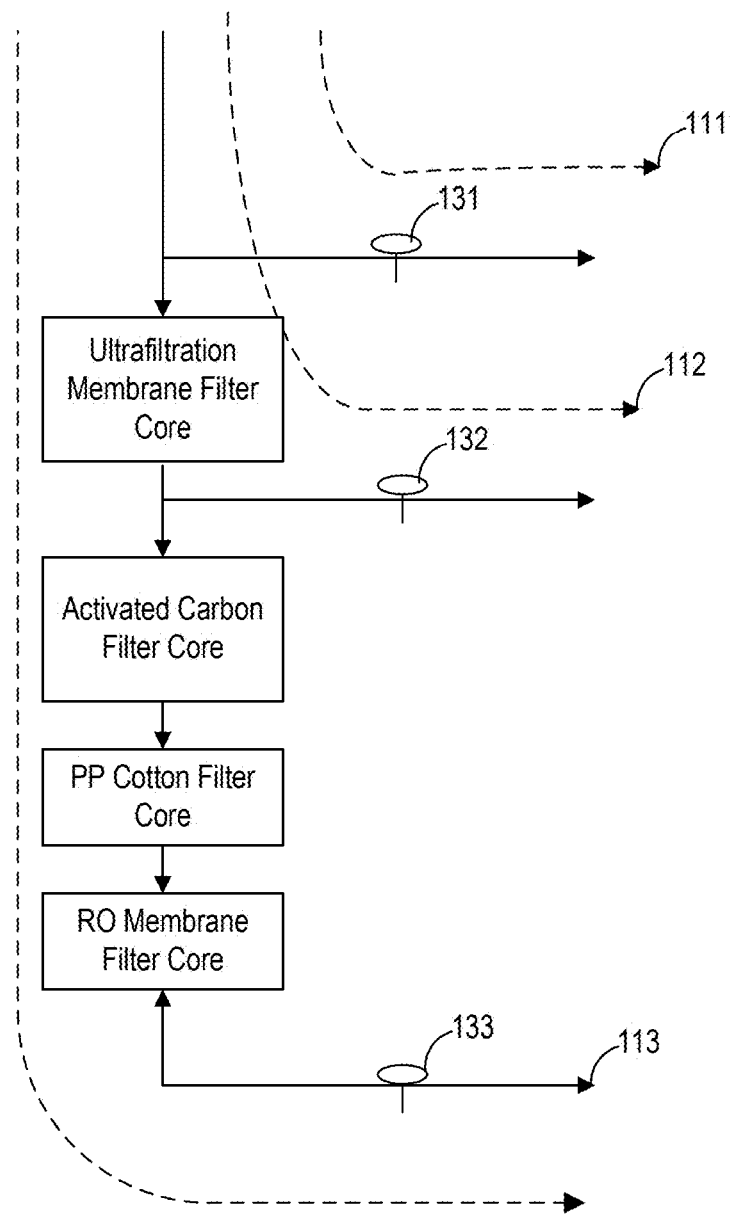
FIG. 1B is a schematic diagram of water output routes according to an exemplary embodiment of the disclosure.

In the present embodiment, the water output route is a water route without filter cores, or corresponds to different filter cores or filter core combinations. As shown in FIG. 1B, for example, a water output route 111 is the primary water output route. Water flowing through the primary water output route is unpurified tap water. A water output route 112 is a first filtering level water route, which corresponds to a filter core of an activated ultrafiltration membrane. Water flowing through the first filtering level water route is clean water after being filtering by the filter core of an ultrafiltration membrane. A water output route 113 is a second filtering level water route, which corresponds to a filter core being a combination of an ultrafiltration membrane, an activated carbon filter core, a PP cotton filter core, and an RO (Reverse Osmosis membrane) filter core. Water flowing through the second filtering level water route is filtered by the combination of the ultrafiltration membrane, the activated carbon filter core, the PP cotton filter core, and the RO (Reverse Osmosis membrane) filter core. The filtered water is pure water. Various water output routes corresponding to different filter cores can be arranged, and the disclosure does not limit the type of filter cores in water output routes.

In the present embodiment, different water output routes are selected to discharge water by controlling opening and closing of different valves. As shown in FIG. 1B, for example, if the water output route 111 is selected to discharge water, a valve 131 is opened, and valves 132 and 133 are closed. If the water output route 112 is selected to discharge water, a valve 132 is opened, and valves 131 and 133 are closed. If the water output route 113 is selected to discharge water, a valve 133 is opened, and valves 131 and 132 are closed. It can be understood that other valve arranging manners can be arranged, which is not limited by the disclosure.

In the present embodiment, different types of water are output from different water output routes. Therefore, different water output types correspond to different water output routes. For example, in combination with the example in FIG. 1B, output of the tap water corresponds to the water output route 111, output of the clean water corresponds to the water output route 112, and output of the pure water corresponds to the water output route 113. Correspondences of information of different water output types to information of water output routes are stored in advance.

In the present embodiment, information of the water output routes is information for selecting water output of the water output route, or control information for selecting water output of the water output route. For example, the information of the water output route is information for controlling opening and closing of preset valves. For example, in combination with the example in FIG. 1B, the information of the water output route corresponding to the water output route 111 is information of controlling opening of the valve 131, and closing of the valves 132 and 133. The information of the water output route corresponding to the water output route 112 is information of controlling opening of the valve 132, and closing of the valves 131 and 133. The information of the water output route corresponding to the water output route 113 is information of controlling opening of the valve 133, and closing of the valves 131 and 132. The information of the water output route is information in other forms, and the disclosure not limited to a specific form or content of the information of the water output route.

In an exemplary embodiment, step 106 includes, according to the information of the water output route, controlling the water purifier to output water via the water output route. According to the information of the water output route, the water purifier is controlled to output water via the water output route. For example, in combination with the example in FIG. 1B, if the reference water output type is output of tap water, a corresponding water output route is the water output route 111, and the water purifier is controlled to output tap water via the water output route 111 (by opening the valve 131 and closing the valves 132 and 133). If the reference water output type is output of clean water, a corresponding water output route is the water output route 112, and the water purifier is controlled to output clean water via the water output route 112 (by opening the valve 132 and closing the valves 131 and 133). If the reference water output type is output of pure water, a corresponding water output route is the water output route 113, and the water purifier is controlled to output clean water via the water output route 113 (by opening the valve 133 and closing the valves 131 and 132).

According to the method 100 for controlling water output of a water purifier provided in above embodiment of the disclosure, whether there is a content in a container is determined when the container is placed in a water collecting region of the water purifier. When there is no content in the container, reference water output type information is determined based on category information of the container. When there is content in the container, the reference water output type information is determined based on category information of the content placed in the container, and information of a corresponding water output route is determined according to the reference water output type information to control the water purifier to output water via the water output route. A user does not need to select a water output type and efficiency of the water purifier usage is improved.

Figure 2:
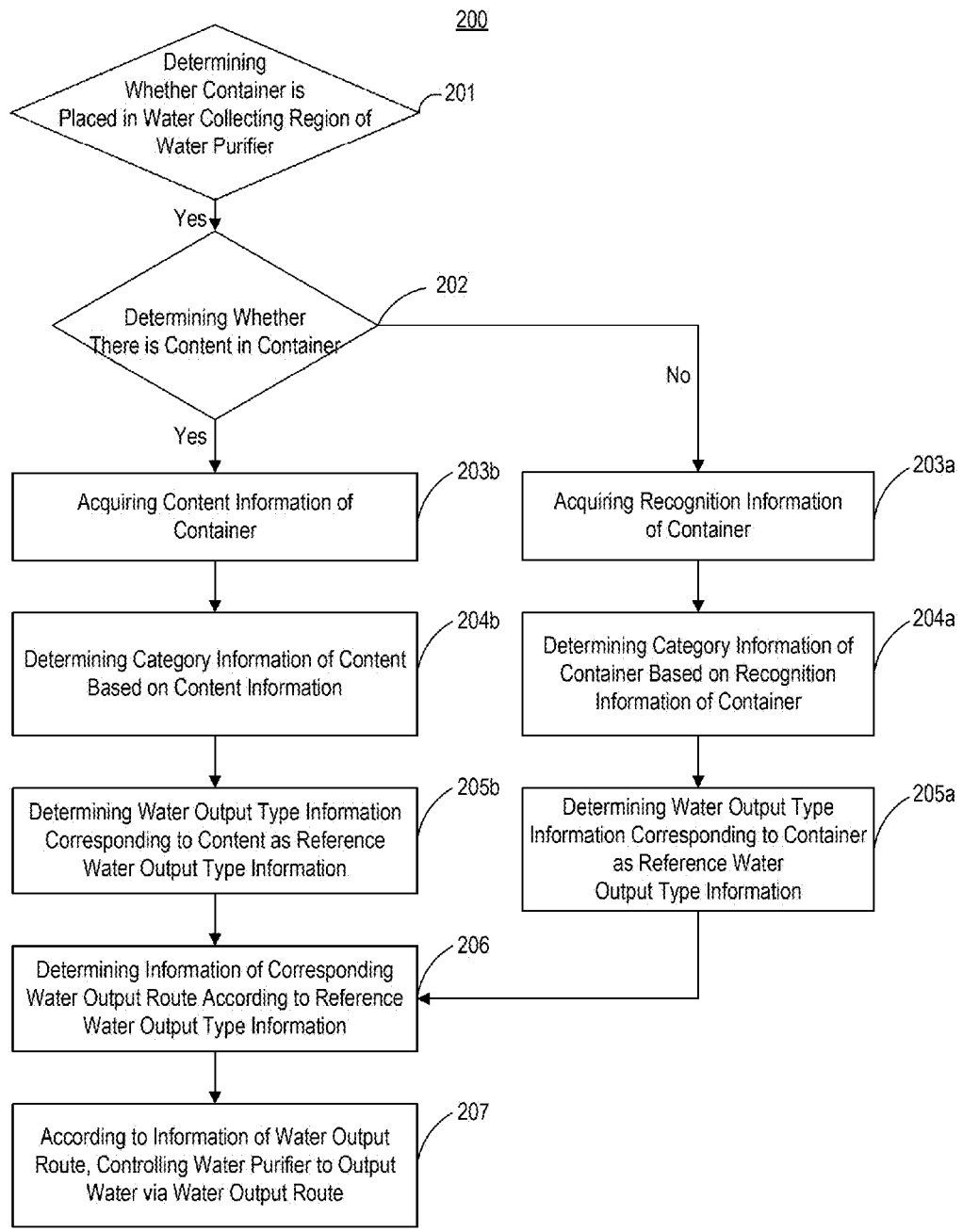
FIG. 2 is a flow chart of a method for controlling water output of a water purifier according to an exemplary embodiment of the disclosure.

FIG. 2 is a flow chart of a method 200 for controlling water output of a water purifier according to an exemplary embodiment of the disclosure. The present embodiment describes a process of determining category information of a container and category information of a content. The method 200 is applied to a water purifier and comprises following steps.

In an exemplary embodiment, step 201 includes determining whether a container is placed in a water collecting region of the water purifier. Step 202 includes determining whether there is a content in the container when the container is placed in the water collecting region. Step 203a includes acquiring recognition information of the container when there is no content in the container. Step 204a includes determining category information of the container based on the recognition information of the container.

In an exemplary embodiment, when the container is placed in the water collecting region, an image of the container can be captured by a camera device. The camera device can be arranged at any position where it is capable of capturing the image of the container placed in the water collecting region of the water purifier. The disclosure does not limit the camera device to a specific position. Next, an image corresponding to the image of the container is looked up from prestored images as a container reference image. Category information associated with the container reference image is determined as the category information of the container.

Images of various containers can be prestored. Further, correspondences between the images of various containers and associated category information are stored. After the image of the container is acquired, an image closest to the image of the container is looked up from stored images of various containers as a container reference image. Then category information is looked up, using the container reference image and based on the stored correspondences between the images of the container and associated category information, as the category information of the container.

In another exemplary embodiment, when the container is placed in the water collecting region, the information carried by an electronic label of the container can be acquired by a reading device capable of reading the electronic information, wherein the information carried by the electronic label of the container comprises name information, category information, production data information, manufacturer information, and the like of the container. The category information of the container can be looked up from the information carried by the electronic label of the container.

In another exemplary embodiment, when the container is placed in the water collecting region, the category information of the container can be determined by information (e.g., image of the container) carried by the electronic label of the container. When the category information of the container is not determined, the category information of the container is alternatively determined by the image of the container (information carried by the electronic label of the container). The category information of the container can be determined by other manners if the category information of the container is still not determined.

In an exemplary embodiment, step 205a includes determining water output type information matched with the container as reference water output type information based on the category information of the container. Step 203b includes acquiring content information of the container when there is content in the container. Step 204b includes determining category information of the content based on the content information.

In the present embodiment, the content information of the container is information for recognizing the content category. For example, the content information of the container is an image of the content or information carried by an electronic label of the content. The content information can be other information for recognizing the content category, and the disclosure is not limited to a specific form of the contained content information.

In an exemplary embodiment, when the container is placed in the water collecting region, an image of the content in the container can be captured by a camera device. Then an image matched with the image of the content is looked up from prestored images as a content reference image. Information associated with the content reference image is determined as category information of the content.

In another exemplary embodiment, when the container is placed in the water collecting region, the information carried by the electronic label of the content of the container can be acquired by a reading device that reads the electronic label. The category information of the content is looked up using the information carried by the electronic label of the content.

In another exemplary embodiment, when the container is placed in the water collecting region, the category information of the content can be determined by information carried by the electronic label of the content of the container (e.g., image of the content of the container). When the category information of the content is not determined, the category information of the content can be alternatively determined by the image of the content (information carried by the electronic label of the content). If the category information of the content is still not determined, the category information of the content can be determined by other manners.

Step 205b includes determining water output type information corresponding to the content as reference water output type information based on the category information of the content. Step 206 includes determining information of a corresponding water output route according to the reference water output type information. Step 207 includes controlling the water purifier to output water via the water output route according to the information of the water output route.

The steps in the embodiment of FIG. 1A that also exist in the embodiment of FIG. 2 are not repeated here. For example, step 201 and step 202 are the same as step 101 and step 102.

According to the method 200 for controlling water output of a water purifier provided in above embodiment of the disclosure, category information of a container or a content of a container is determined based on recognition information of the container or content information of the container. Reference water output type information is determined based on the category information. Information of a corresponding water output route is determined according to the reference water output type information for controlling the water purifier to output water via the water output route. A user does not need to select a water output type and efficiency of the water purifier usage is improved.

Figure 3:
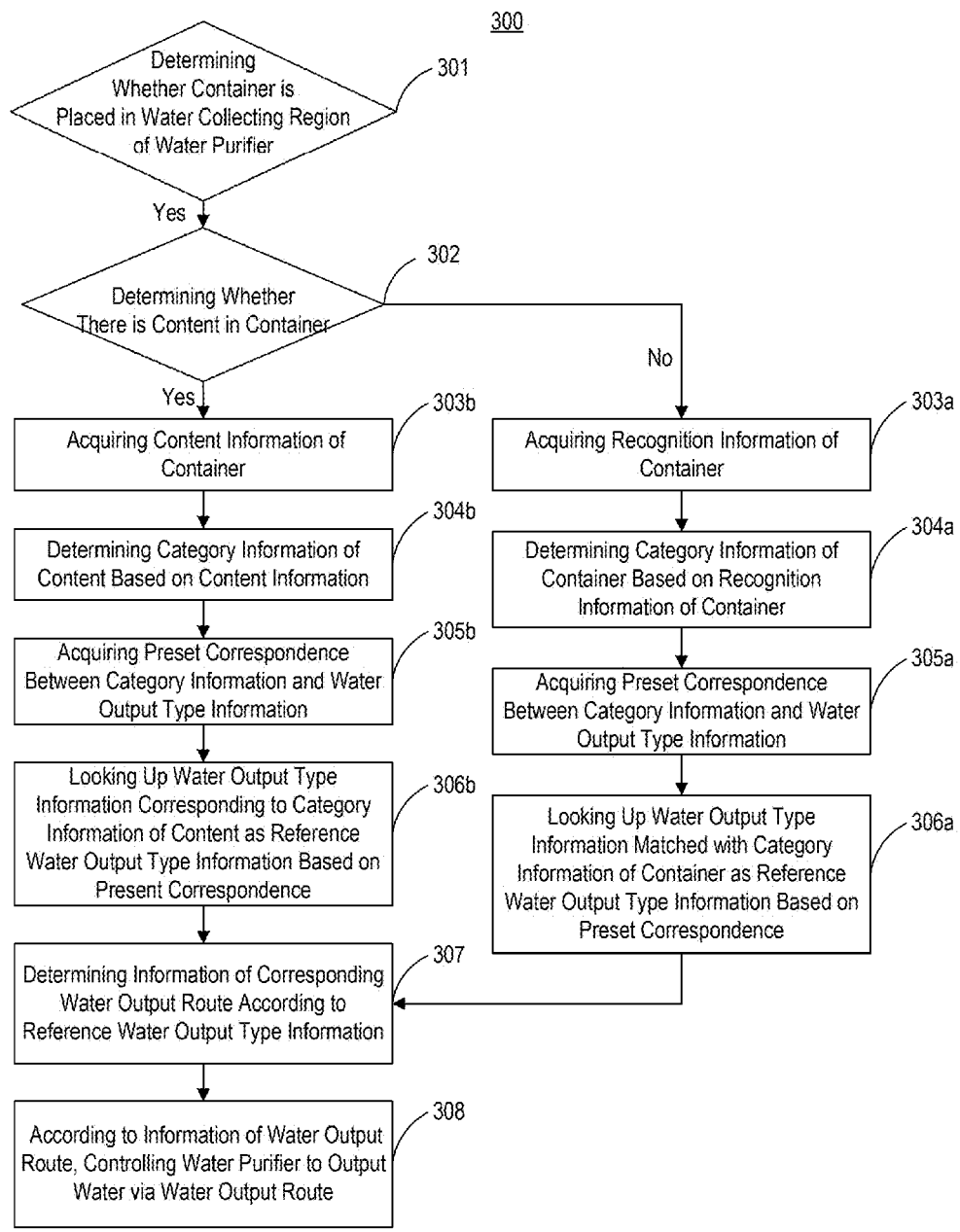
FIG. 3 is a flow chart of a method for controlling water output of a water purifier according to an exemplary embodiment of the disclosure.

FIG. 3 is a flow chart of method 300 for controlling water output of a water purifier according to an exemplary embodiment of the disclosure. The present embodiment describes a process of determining information of water output type corresponding to a container based on category information of the container; and a process of determining information of water output type corresponding to the content based on category information of the content. The method 300 is applied to a water purifier and comprises following steps.

In an exemplary embodiment, step 301 includes determining whether a container is placed in a water collecting region of the water purifier. Step 302 includes determining whether there is a content in the container when the container is placed in the water collecting region. Step 303*a* includes acquiring recognition information of the container when there is no content in the container. Step 304*a* includes determining category information of the container based on the recognition information of the container. Step 305*a* includes acquiring a preset correspondence between the category information and the information of water output type. Step 306*a* includes looking up water output type information corresponding to the category information of the container as reference water output type information based on their correspondence.

In the present embodiment, correspondences between the category information and the water output type information are preset and stored. For example, a cup corresponds to pure water. A bowl, lunchbox, or vegetable basin corresponds to clean water. A wash basin or a garbage corresponds to tap water, etc. The correspondences between the category and the water output type are preset by a user, or as a system default.

Preset correspondences between the category information and the water output type are stored in a local water purifier or on a preset server. Therefore, the preset correspondences between the category information and the water output type are acquired locally or from the preset server through a network.

In an exemplary embodiment, step 303*b* includes acquiring content information of the container when there is content in the container. Step 304*b* includes determining category information of the content based on the content information. Step 305*b* includes acquiring a preset correspondence between the category information and the water output type information. Step 306*b* includes looking up water output type information corresponding to the category information of the content as reference water output type information based on the correspondence.

In the present embodiment, the correspondences between the category information and the water output type information are preset. For example, fruit corresponds to output of pure water. Vegetable corresponds to output of clean water. Clothes correspond to output of tap water, and the like. The correspondences between the category information and the water output type information are preset by a user, or as a system default.

In an exemplary embodiment, step 307 includes determining information of a corresponding water output route according to the reference water output type information. Step 308 includes, according to the information of the water output route, controlling the water purifier to output water via the water output route.

The steps in the embodiment of FIG. 1A that also exist in the embodiment of FIG. 3 are not repeated here. For example, step 301 and step 302 are the same as step 101 and step 102.

According to the method 300 for controlling water output of a water purifier provided in above embodiment of the disclosure, water output type information corresponding to a container or content is looked up from preset correspondences between category information and water output type information as reference water output type information. Information of a corresponding water output route is determined according to the reference water output type information for controlling the water purifier to output water via the water output route. A user does not need to select a water output type and efficiency of the water purifier usage is improved.

Figure 4:
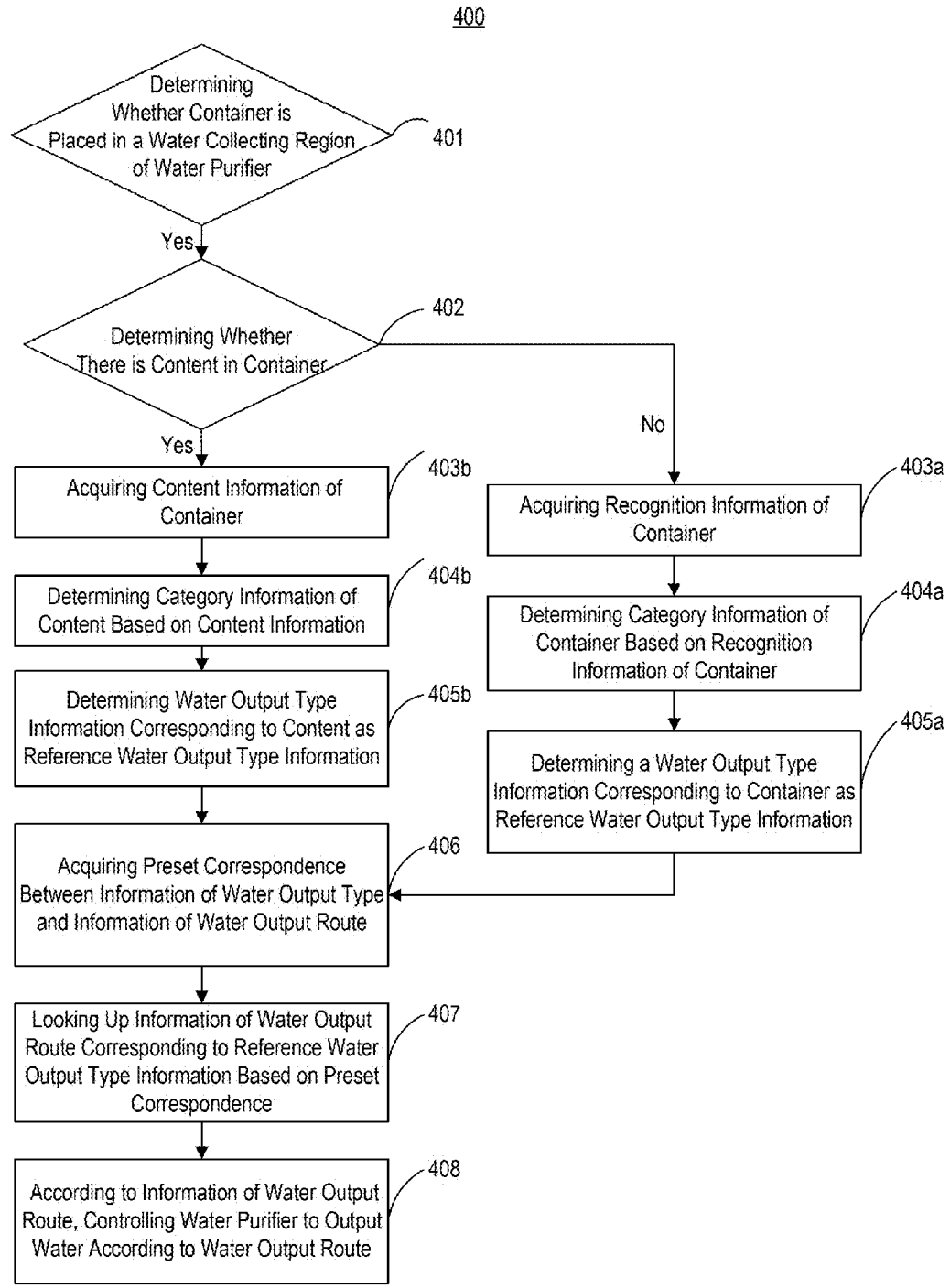
FIG. 4 is a flow chart of a method for controlling water output of a water purifier according to an exemplary embodiment of the disclosure.

FIG. 4 is a flow chart of a method 400 for controlling water output of a water purifier according to an exemplary embodiment of the disclosure. The present embodiment describes a process of determining information of a corresponding water output route according to reference water output type information. The method 400 is applied to a water purifier and comprises following steps.

In an exemplary embodiment, step 401 includes determining whether a container is placed in a water collecting region of the water purifier. Step 402 includes determining whether there is a content in the container when the container is placed in the water collecting region. Step 403*a* includes acquiring recognition information of the container when there is no content in the container. Step 404*a* includes determining category information of the container based on the recognition information of the container. Step 405*a* includes determining water output type information corresponding to the container as reference water output type information based on the category information of the container. Step 403*b* includes acquiring content information of the container when there is content in the container. Step 404*b* includes determining category information of the content based on the content information. Step 405*b* includes determining water output type information corresponding to the content as reference water output type information based on the category information of the content. Step 406 includes acquiring a preset correspondence between the water output type information and the information of the water output route. Step 407 includes looking up information of a water output route corresponding to the reference water output type information based on the preset correspondence.

In the present embodiment, correspondences between the water output type information and the information of the water output route are stored in advance. For example, output of the tap water corresponds to a water output route 111; output of the clean water corresponds to a water output route 112; and output of the pure water corresponds to a water output route 113, etc.

Correspondences between the water output type information and the water output route are stored in a local water purifier or on a preset server. Therefore, the correspondences between the water output type information and the water output route are acquired locally or from the preset server through a network.

In an exemplary embodiment, step 408 includes, according to the information of the water output route, controlling the water purifier to output water according to the water output route.

The steps in the embodiment of FIG. 1A that also exist in the embodiment of FIG. 4 are not repeated here. For example, step 401 and step 402 are the same as step 101 and step 102.

According to the method 400 for controlling water output of a water purifier provided in above embodiment of the disclosure, by a preset correspondence between water output type information and information of a water output route, information of a water output route corresponding to the reference water output type information is looked up for controlling the water purifier to output water via the water output route. A user does not need to select a water output type and efficiency of the water purifier usage is improved.

Although operations of above methods are described in specific sequence in the drawings, the methods are not so limited. Execution sequences of operations or steps shown in the figures can be modified. Further, not all operations or steps in the methods are required. Some steps can be omitted. Further, a plurality of steps can be combined into one step and executed collectively. Additionally, a step can be divided into a plurality of steps to be executed individually.

Figure 5:
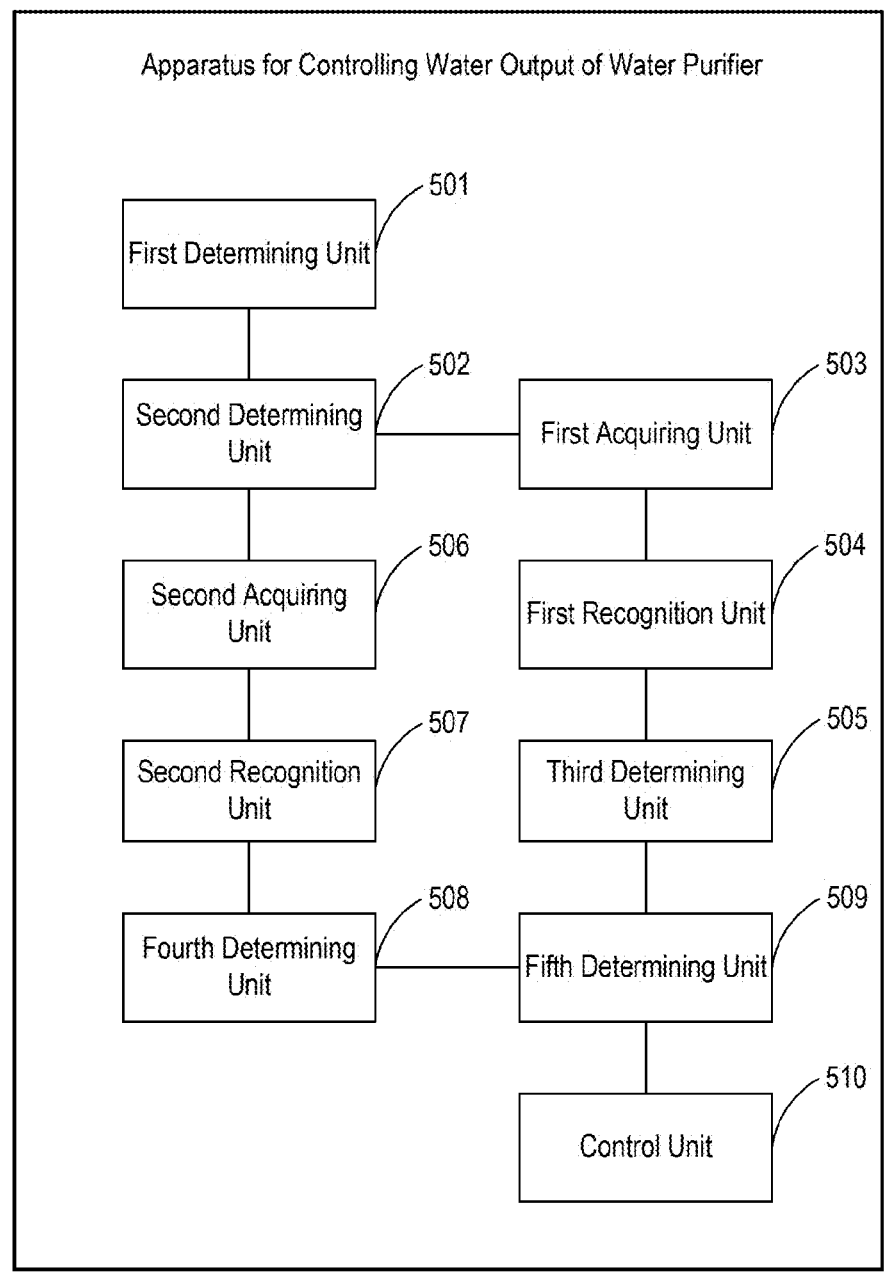
FIG. 5 is a block diagram of an apparatus for controlling water output of a water purifier according to an exemplary embodiment of the disclosure.

FIG. 5 is a block diagram of an apparatus 500 for controlling water output of a water purifier according to an exemplary embodiment of the disclosure. The apparatus 500 comprises: a first determining unit 501, a second determining unit 502, a first acquiring unit 503, a first recognition unit 504, a third determining unit 505, a second acquiring unit 506, a second recognition unit 507, a fourth determining unit 508, a fifth determining unit 509 and a control unit 510.

The first determining unit 501 is configured to determine whether a container is placed in a water collecting region of the water purifier. The second determining unit 502 is configured to determine whether there is a content in the container when the container is placed in the water collecting region. The first acquiring unit 503 is configured to acquire recognition information of the container when there is no content in the container. The first recognition unit 504 is configured to determine category information of the container based on the recognition information. The third determining unit 505 is configured to determine a water output type information corresponding to the container as reference water output type information based on the category information of the container.

The second acquiring unit 506 is configured to acquire content information of the container when there is content in the container. The second recognition unit 507 is configured to determine category information of the content based on the content information. The fourth determining unit 508 is configured to determine a water output type information corresponding to the content as reference water output type information based on the category information of the content. The fifth determining unit 509 is configured to determine information of a corresponding water output route according to the reference water output type information. The control unit 510 is configured to, according to the information of the water output route, control the water purifier to output water via the water output route.

Figure 6:
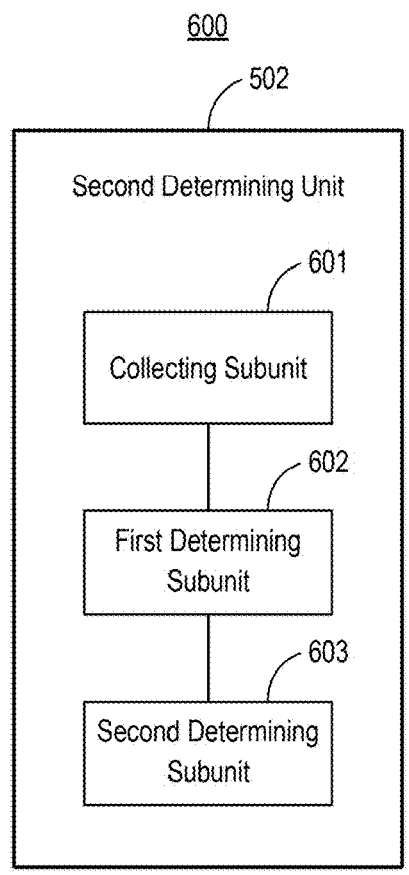
FIG. 6 is a block diagram of an apparatus for controlling water output of a water purifier according to an exemplary embodiment of the disclosure.

FIG. 6 is a block diagram of apparatus 600 for controlling water output of a water purifier. In an exemplary embodiment, which is based on the embodiment as shown in FIG. 5, the second determining unit 502 includes a collecting subunit 601, a first determining subunit 602 and a second determining subunit 603. The collecting subunit 601 is configured to collect a plan view image of the container. The first determining subunit 602 is configured to determine whether the plan view image of the container contains an image of the content.

The second determining subunit 603 is configured to determine whether there is content in the container when the plan view image of the container contains the image of the content.

Figure 7:
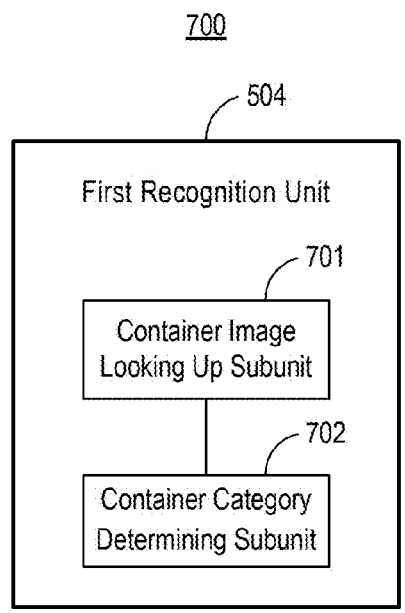
FIG. 7 is a block diagram of an apparatus for controlling water output of a water purifier according to an exemplary embodiment of the disclosure.

FIG. 7 is a block diagram of an apparatus 700 for controlling water output of a water purifier. In an exemplary embodiment, which is based on the embodiment as shown in FIG. 5, the first recognition unit 504 includes a container image looking up subunit 701 and a container category determining subunit 702. The container image looking up subunit 701 is configured to look up an image corresponding to the image of the container from preset images as a container reference image.

The container category determining subunit 702 is configured to determine category information associated with the container reference image as category information of the container. The recognition information of the container comprises the image of the container.

Figure 8:
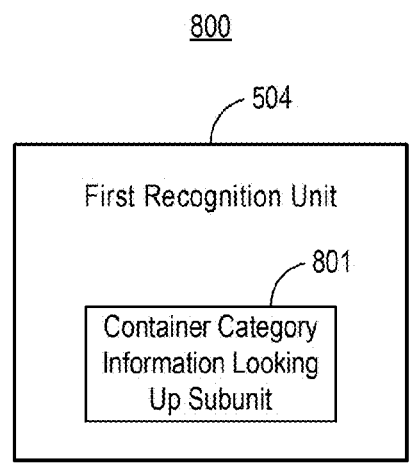
FIG. 8 is a block diagram of an apparatus for controlling water output of a water purifier according to an exemplary embodiment of the disclosure.

FIG. 8 is a block diagram of an apparatus 800 for controlling water output of a water purifier. In an exemplary embodiment, which is based on the embodiment as shown in FIG. 5, the first recognition unit 504 includes a container category information looking up subunit 801 that is configured to look up category information of the container from the information carried by an electronic label of the container. The recognition information of the container comprises information carried by the electronic label of the container.

Figure 9:
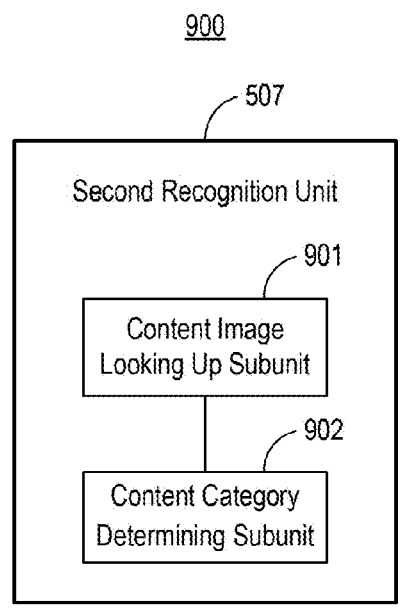
FIG. 9 is a block diagram of an apparatus for controlling water output of a water purifier according to an exemplary embodiment of the disclosure.

FIG. 9 is a block diagram of an apparatus 900 for controlling water output of a water purifier. In an exemplary embodiment, which is based on the embodiment as shown in FIG. 5, the second recognition unit 507 includes a content image looking up subunit 901 and a content category determining subunit 902. The content image looking up subunit 901 is configured to look up an image corresponding to the image of the content from prestored images as a content reference image.

The content category determining subunit 902 is configured to determine category information associated with the content reference image as category information of the content. The content information of the container comprises the image of the content.

Figure 10:
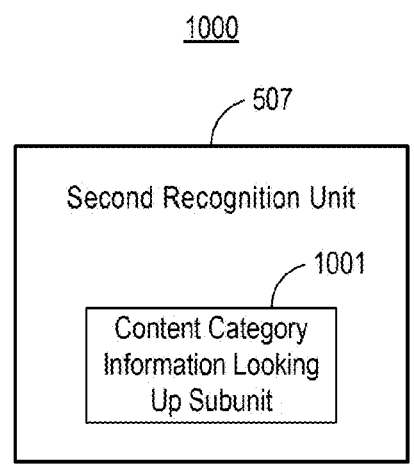
FIG. 10 is a block diagram of an apparatus for controlling water output of a water purifier according to an exemplary embodiment of the disclosure.

FIG. 10 is a block diagram of an apparatus 1000 for controlling water output of a water purifier. In an exemplary embodiment, which is based on the embodiment as shown in FIG. 5, the second recognition unit 507 includes a content category information looking up subunit 1001 configured to look up the category information of the content from the information carried by an electronic label of the content. The content information of the container comprises information carried by the electronic label of the content.

Figure 11:
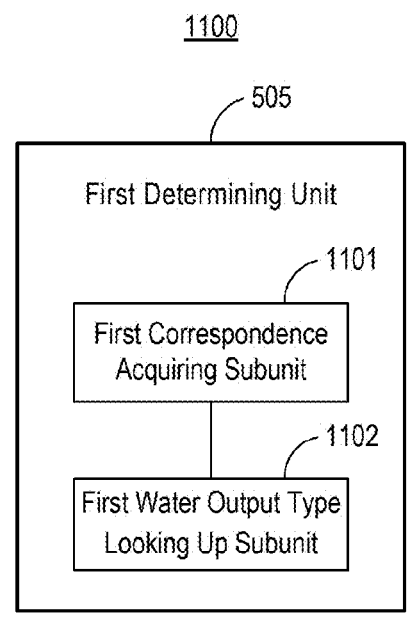
FIG. 11 is a block diagram of an apparatus for controlling water output of a water purifier according to an exemplary embodiment of the disclosure.

FIG. 11 is a block diagram of an apparatus 1100 for controlling water output of a water purifier. In an exemplary embodiment, which is based on the embodiment as shown in FIG. 5, the first determining unit 505 includes a first correspondence acquiring subunit 1101 and a first water output type looking up subunit 1102. The first correspondence acquiring subunit 1101 is configured to acquire a preset correspondence between the category information and the water output type information.

The first water output type looking up subunit 1102 is configured to look up water output type information corresponding to the category information of the container as information of the water output type corresponding to the container based on the preset correspondence.

Figure 12:
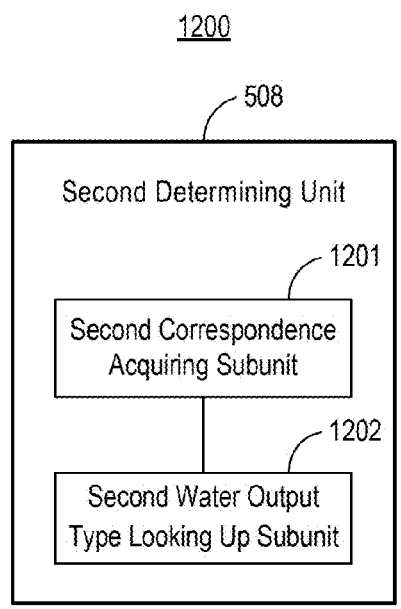
FIG. 12 is a block diagram of an apparatus for controlling water output of a water purifier according to an exemplary embodiment of the disclosure.

FIG. 12 is a block diagram of an apparatus 1200 for controlling water output of a water purifier. In an exemplary embodiment, which is based on the embodiment as shown in FIG. 5, the second determining unit 508 includes a second correspondence acquiring subunit 1201, and a second water output type looking up subunit 1202. The second correspondence acquiring subunit 1201 is configured to acquire a preset correspondence between the category information and the water output type information.

The second water output type looking up subunit 1202 is configured to look up water output type information corresponding to the category information of the content as information of the water output type corresponding to the content based on the preset correspondence.

Figure 13:
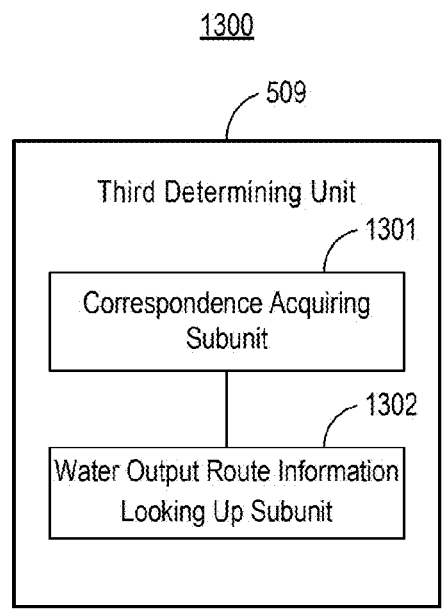
FIG. 13 is a block diagram of an apparatus for controlling water output of a water purifier according to an exemplary embodiment of the disclosure.

FIG. 13 is a block diagram of an apparatus 1300 for controlling water output of a water purifier. In an exemplary embodiment, which is based on the embodiment as shown in FIG. 5, fifth determining unit 509 includes a correspondence acquiring subunit 1301 and a water output route information looking up subunit 1302. The correspondence acquiring subunit 1301 is configured to acquire a preset correspondence between the water output type information and the information of the water output route. The water output route information looking up subunit 1302 is configured to look up information of a water output route corresponding to the reference water output type information based on the correspondence.

In exemplary embodiments, the water output route comprises one or more of a primary water route, a first filtering level water route, and a second filtering level water route. Water from the primary water route contains more impurity than water from the first filtering level water route; and water from the first filtering level water route contains more impurity than water from the second filtering level water route.

In an embodiment, the electronic label comprises one or more of an electronic label containing an NFC chip, an electronic label containing a low power consumption Bluetooth chip, an electronic label containing a low power consumption Wi-Fi chip, an electronic label containing a low power consumption ZigBee chip, or an electronic label containing an RFID chip.

In another embodiment, the water output type comprises one or more of output of unpurified water, and output of first purified water and second purified water. The first purified water contains more impurity than the second purified water.

Methods of operating apparatus 1300 are preset in a water purifier, or loaded onto the water purifier by downloading. Units in the apparatus cooperate with corresponding units in the water purifier to control water output of the water purifier.

Embodiments of the apparatus correspond to the embodiments of the method. The above described embodiments of the apparatus are exemplary. Units described as separation parts may be physically separated or not physically separated. Parts as unit display may be physical units or not physically units, and may be located at one position or distributed to a plurality of network units. Part or all of the modules can be selected according to practical requirements to realize goals of the disclosure. A person of ordinary skill in the art can understand and implements the disclosure without creative labor.

Figure 14:
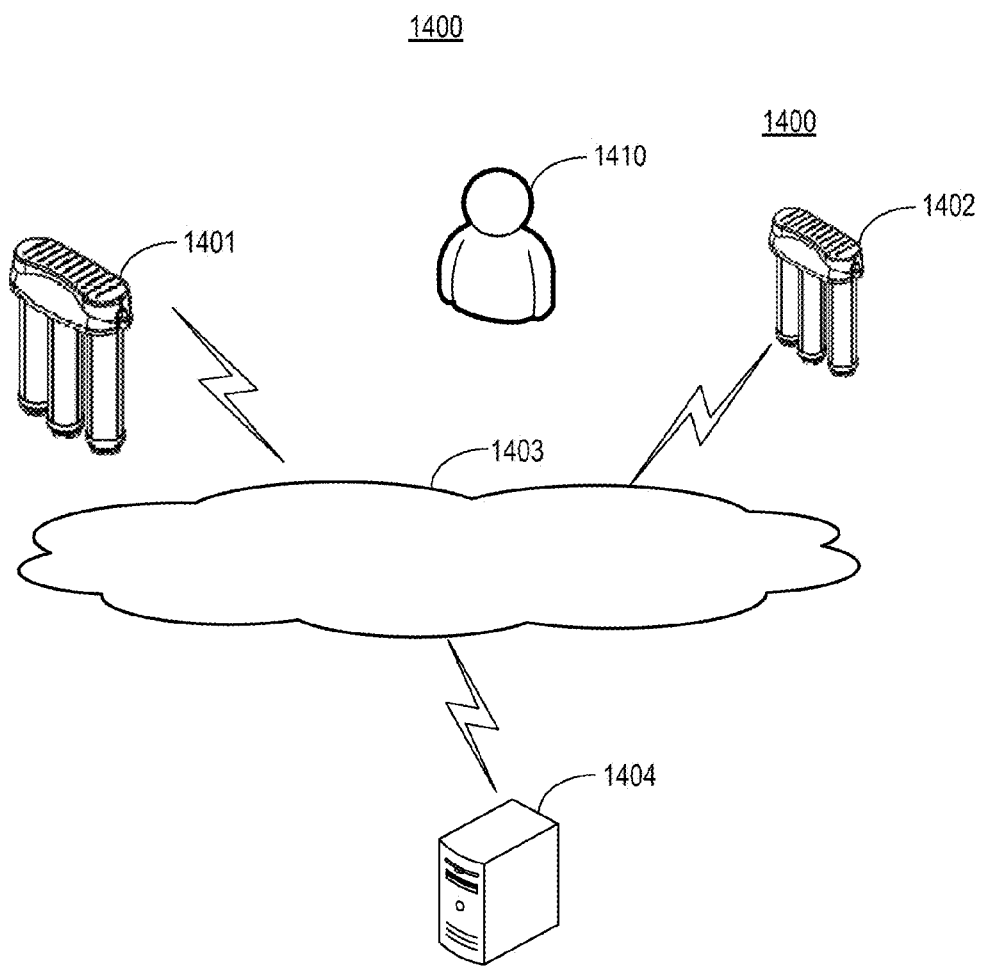
FIG. 14 is a schematic diagram of a system according to an exemplary embodiment of the disclosure.

FIG. 14 is a schematic diagram of an exemplary system 1400 according to an embodiment of the disclosure. As shown in FIG. 14, the system 1400 may comprise water purifier devices 1401 and 1402, a network 1403, and a server 1404. The network 1403 provides a medium for a communication link among the water purifier devices 1401 and 1402 and the server 1404. The network 1403 may include various types of connections, such as wired, wireless communication links, optical cables, or the like.

A user 1410 uses the water purifier devices 1401 and 1402, which interact with server 1404 through the network 1403 to receive or upload information or the like.

The server 1404 is a server providing various services. The server stores, analyzes, and the like on received data, and feeds a processed result back to the water purifier devices. The server responds to a service request of the user to provide service. For example, the server provides a preset correspondence between a category and a water output type to the water purifier devices or a correspondence between water output type information and information of a water output route to the water purifier devices. A server can provide one or more services, and the same service can be provided by a plurality of servers.

The number or quantity of the water purifier devices, network, and server in FIG. 14 are illustrative. A number of water purifier devices, networks, and servers can be implemented.

The disclosure also provides a water purifier, comprising a processor; and a memory for storing a command executable by the processor, wherein the process is configured to: determine whether a container is placed in a water collecting region of the water purifier; determine whether there is content in the container when the container is placed in the water collecting region; acquire recognition information of the container when there is no content in the container, and determine category information of the container based on the recognition information; determine a water output type information corresponding to the container as reference water output type information based on the category information of the container; acquire content information of the container when there is content in the container, and determine category information of the content based on the content information; determine a water output type information corresponding to the content as reference water output type information based on the category information of the content; determine information of a corresponding water output route according to the reference water output type information; and according to the information of the water output route, control the water purifier to output water via the water output route.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and embodiment be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method performed by a processor of a water purifier to control water output of a water purifier, comprising:
   determining, by the processor via at least one of a sensor, an imaging device, or a signal transceiver, whether a container is placed in a water collecting region of the water purifier;
   determining, by the processor via at least one of the sensor, the imaging device, or the signal transceiver, whether there is a content in the container when the container is placed in the water collecting region;
   acquiring, by the processor via at least one of the sensor, the imaging device, or the signal transceiver, recognition information of the container when there is no content in the container, and determining category information of the container based on the recognition information;

determining, by the processor, water output type information corresponding to the container as reference water output type information based on the category information of the container, the water output type information indicating a purity level of the water output of the water purifier;

acquiring, by the processor via at least one of the sensor, the imaging device, or the signal transceiver, content information of the container when there is content in the container, and determining category information of the content based on the content information;

determining, by the processor, water output type information corresponding to the content as reference water output type information based on the category information of the content;

determining, by the processor, information of a selected corresponding water output route according to the reference water output type information, the water output route comprising at least one filter core; and according to the information of the water output route, controlling, by the processor, the water purifier to output water via the water output route.

2. The method according to claim 1, wherein the determining whether there is content in the container comprises:
capturing, via the imaging device, a plan view image of the container;
determining whether the plan view image of the container contains an image of the content; and
determining that there is content in the container when the plan view image of the container contains the image of the content.

3. The method according to claim 1, wherein:
the recognition information of the container comprises an image of the container;
the determining category information of the container based on the recognition information of the container comprises:
looking up an image corresponding to the image of the container from prestored images as a container reference image; and
determining category information associated with the container reference image as category information of the container.

4. The method according to claim 1, wherein:
the recognition information of the container comprises information carried by an electronic label of the container;
the determining category information of the container based on the recognition information of the container comprises:
looking up category information of the container from the information carried by the electronic label of the container.

5. The method according to claim 4, wherein the electronic label comprises one or more of an electronic label containing an NFC chip, an electronic label containing a low power consumption Bluetooth chip, an electronic label containing a low power consumption Wi-Fi chip, an electronic label containing a low power consumption ZigBee chip, and an electronic label containing an RFID chip.

6. The method according to claim 1, wherein:
the content information of the container comprises an image of the content;
the determining category information of the content based on the content information comprises:
looking up an image corresponding to the image of the content from prestored images as a content reference image; and
determining category information associated with the content reference image as category information of the content.

7. The method according to claim 1, wherein:
the content information of the container comprises information carried by an electronic label of the content;
the determining category information of the content based on the content information comprises:
looking up the category information of the content from the information carried by the electronic label of the content.

8. The method according to claim 1, wherein the determining a water output type information corresponding to the container based on the category information of the container comprises:
acquiring a preset correspondence between the category information and the water output type information; and
looking up a water output type information corresponding to the category information of the container as the water output type information corresponding to the container based on the preset correspondence.

9. The method according to claim 1, wherein the determining a water output type information corresponding to the content based on the category information of the content comprises:
acquiring a preset correspondence between the category information and the water output type information; and
looking up a water output type information corresponding to the category information of the content as the water output type information corresponding to the content based on the present correspondence.

10. The method according to claim 1, wherein the determining information of a corresponding water output route according to the reference water output type information comprises:
acquiring a preset correspondence between the information of the water output type and the information of the water output route; and
looking up information of a water output route corresponding to the reference water output type information based on the preset correspondence.

11. The method according to claim 1, wherein the water output route comprises one or more of a primary water route, a first filtering level water route, and a second filtering level water route, wherein water from the primary water route contains more impurity than water from the first filtering level water route, and water from the first filtering level water route contains more impurity than water from the second filtering level water route.

12. The method according to claim 1, wherein the water output type comprises one or more of output of unpurified water, output of first purified water, and output of second purified water, wherein the first purified water contains more impurity than the second purified water.

13. A water purifying system, comprising:
at least one of a sensor, an imaging device, or a signal transceiver;
a plurality of water output routes, each of the plurality of water output routes including at least one filter core;
a processor; and
a memory for storing a command executable by the processor, wherein, the processor is configured to:

determine, via at least one of the sensor, the imaging device, or the signal transceiver, whether a container is placed in a water collecting region of the water purifier;

determine, via at least one of the sensor, the imaging device, or the signal transceiver, whether there is content in the container when the container is placed in the water collecting region;

acquire, via at least one of the sensor, the imaging device, or the signal transceiver, recognition information of the container when there is no content in the container, and determine category information of the container based on the recognition information;

determine water output type information corresponding to the container as reference water output type information based on the category information of the container, the water output type information indicating a purity level of the water output of the water purifier;

acquire, via at least one of the sensor, the imaging device, or the signal transceiver, content information of the container when there is content in the container, and determine category information of the content based on the content information;

determine water output type information corresponding to the content as reference water output type information based on the category information of the content;

determine information of a corresponding water output route according to the reference water output type information; and according to the information of the water output route, control the water purifier to output water via the water output route.

14. The water purifier according to claim 13, wherein the processor is further configured to:
capture, via the imaging device, a plan view image of the container;
determine whether the plan view image of the container contains an image of the content; and
determine that there is content in the container when the plan view image of the container contains the image of the content.

15. The water purifier according to claim 13, wherein the recognition information of the container comprises an image of the container; and the processor is further configured to:
look up an image corresponding to the image of the container from prestored images as a container reference image; and
determine category information associated with the container reference image as category information of the container.

16. The water purifier according to claim 13, wherein the recognition information of the container comprises information carried by an electronic label of the container; and the processor is further configured to:
look up category information of the container from the information carried by the electronic label of the container.

17. The water purifier according to claim 13, wherein the content information of the container comprises an image of the content; and the processor is further configured to:
look up an image corresponding to the image of the content from prestored images as a content reference image; and
determine category information associated with the content reference image as category information of the content.

18. The water purifier according to claim 13, wherein the content information of the container comprises information carried by an electronic label of the content; and the processor is further configured to:
look up the category information of the content from the information carried by the electronic label of the content.

19. The water purifier according to claim 13, wherein the processor is further configured to:
acquire a preset correspondence between the category information and the water output type information; and
look up a water output type information corresponding to the category information of the container as the water output type information corresponding to the container based on the matching relation.

* * * * *